US005749932A

United States Patent [19]

Lamar et al.

[11] Patent Number: 5,749,932
[45] Date of Patent: May 12, 1998

[54] REFRACTORY ELECTRODES FOR JOULE HEATING AND METHODS OF USING SAME

[75] Inventors: David A. Lamar, West Richland; Chris C. Chapman, Richland; Michael L. Elliott, Kennewick, all of Wash.

[73] Assignee: Battelle Memorial Institute, Richland, Wash.

[21] Appl. No.: 625,021

[22] Filed: Mar. 29, 1996

[51] Int. Cl.$^6$ .................. C03B 5/027; C03B 5/03
[52] U.S. Cl. .................. 65/135.7; 65/152; 65/374.13; 373/36; 373/88; 501/126; 501/132; 588/252
[58] Field of Search .................. 65/90, 135.6, 135.7, 65/152, 374.13; 373/36, 88; 501/126, 132; 588/10, 11, 12, 252

[56] References Cited

U.S. PATENT DOCUMENTS

| | | | |
|---|---|---|---|
| 4,052,339 | 10/1977 | Costin | 252/512 |
| 4,158,569 | 6/1979 | Brothers et al. | 106/66 |
| 4,376,598 | 3/1983 | Brouns et al. | 405/258 |
| 4,433,995 | 2/1984 | Toussaint | 65/135 |
| 4,491,951 | 1/1985 | Dunn | 373/30 |
| 4,668,262 | 5/1987 | Kithany | 65/1 |
| 4,819,247 | 4/1989 | Seng et al. | 373/30 |
| 4,970,122 | 11/1990 | Palanisamy | 428/432 |
| 5,100,259 | 3/1992 | Buelt et al. | 405/128 |
| 5,354,355 | 10/1994 | Chapman | 75/414 |
| 5,491,102 | 2/1996 | Desu et al. | 437/52 |

OTHER PUBLICATIONS

"Electric Melting of Glass", J. Stanek, 1977, Elsevier Scientific no month avail.

*Primary Examiner*—Donald E. Czaja
*Assistant Examiner*—Sean Vincent
*Attorney, Agent, or Firm*—Paul W. Zimmerman

[57] ABSTRACT

A certain group of electrically conductive refractory materials presently known for use in high temperature applications as throat constructions, melter sidewalls, forehearth, stacks, port sills, hot face lining for slagging coal gasifiers, slag runners, and linings for nuclear waste encapsulation furnaces may be used as electrodes permitting joule heating at temperatures in excess of 1200 C. in excess of about 4400 hours even in the presence of transition group element(s). More specifically, the invention is an electrode for melting earthen materials, wherein the electrode is made from an electrically conductive refractory material, specifically at least one metal oxide wherein the metal is selected from the group consisting of chrome, ruthenium, rhodium, tin and combinations thereof.

22 Claims, 2 Drawing Sheets

REFRACTORY ELECTRODES FOR JOULE HEATING AND METHODS OF USING SAME

This invention was made with Government support under Contract DE-AC06-76RLO 1830 awarded by the U.S. Department of Energy. The Government has certain rights in the invention.

FIELD OF THE INVENTION

The present invention relates to electrodes used for melting earthen materials. More specifically, the invention relates to using electrically conductive refractory materials as electrodes for joule heating. In this patent application, the term "earthen materials" refers to inorganic non-metallic materials, for example minerals, ceramics, glasses and combinations thereof.

BACKGROUND OF THE INVENTION

Melting of earthen materials is important in many industries, especially the glass industry producing bottle glass, window glass, fiberglass, abrasives, frits and grits. Melting of earthen materials has also become important in solidifying waste materials as discussed in U.S. Pat. Nos. 4,376,598, 5,100,259, directed toward in-situ vitrification, and 5,354,355 directed toward use of a melter.

U.S. Pat. No. 4,376,598 mentions the use of rod-shaped molybdenum permitting operation up to temperatures of about 1500 C. and should not exceed 1750 C. However, the patent notes the necessity of protecting the molybdenum from oxygen at temperatures above about 600 C. to prevent oxidation of the molybdenum. In addition, control of the melt composition is necessary to obtain long life for the molybdenum electrodes. An oxygen impervious coating or a cooled jacket are suggested for protection against high temperature oxygen exposure of the molybdenum.

U.S. Pat. No. 5,100,259 mentions avoidance of oxidation of molybdenum with a graphite collar. It further discusses placement of a conductive ceramic powder in an annulus between the molybdenum electrode and the graphite collar. Specifically, the ceramic powder is zirconium diboride ($ZrB_2$), hafnium diboride ($HfB_2$), or a mixture, molybdenum disilicide and zirconium diboride ($MoSi_2/ZrB_2$) or $HfB_2/MoSi_2$). The ceramic powder sinters and adheres to the molybdenum surface upon exposure to high process temperatures. Alternatively, a coating is flame sprayed onto the molybdenum electrode using a coating of $MoSi_2$, $ZrB_2$, $HfB_2$, $MoSi_2/ZrB_2$, or $HfB_2/MoSi_2$. Further alternatives include flame spraying with a metal, for example stainless steel or providing a glass sleeve or coating on the molybdenum electrode. A disadvantage of the ceramic coatings is that they tend to be brittle and care must be taken in handling to preserve the integrity of the coating.

U.S. Pat. No. 5,354,355 states that electrodes are made from refractory materials including graphite, molybdenum, or tungsten, which may be provided with a cooled sheath.

A disadvantage of molybdenum electrodes and/or coated molybdenum electrodes operated above 1500 C. is that they have a relatively short life and must be frequently replaced. Moreover, having transition group elements in the melt, for example iron, nickel, and/or copper causes shortened electrode life for molybdenum even at temperatures below 1500 C.

In the book Electric Melting of Glass (Staněk 1977), it is reported that electrodes made of nearly 100 wt % tin oxide have been used for glass melting. However, these electrodes have limited chemical compatibility which restricts use to limited melt compositions. For example, melt compositions having substantial quantities of zinc oxide as well as other waste glass constituents from the transition elements cannot be processed in melters utilizing nearly 100 wt % tin oxide electrodes. In addition, nearly 100 wt % tin oxide sublimes when exposed to oxygen (air) at elevated temperatures. Therefore, when used as an electrode, it must be completely submerged in a melt to avoid degradation due to sublimation.

It has been reported that Inconel electrodes develop a chrome oxide layer that prevents further oxidation of the Inconel electrode. However, operation of Inconel electrodes, even those having the chrome oxide layer, is limited to about 1200 C. to avoid softening or melting of the Inconel metal.

There is, therefore, a need for electrodes operable above 1200 C. or in the presence of transition group element(s) having a longer life.

SUMMARY OF THE INVENTION

The present invention is the discovery that a certain group of electrically conductive refractory materials presently known for use in high temperature applications as throat constructions, melter sidewalls, forehearth, stacks, port sills, hot face lining for slagging coal gasifiers, slag runners, and linings for nuclear waste encapsulation furnaces, may be used as electrodes conducting AC electricity and permitting joule heating at temperatures in excess of 1200 C. in excess of about 4400 hours even in the presence of transition group element(s). More specifically, the invention is an electrode for melting earthen materials, wherein the electrode is made from an electrically conductive refractory material, specifically at least one metal oxide wherein the metal is selected from the group consisting of chrome, ruthenium, rhodium, tin and combinations thereof.

It is an object of the present invention to provide an electrode for joule heating of earthen materials that has a life of at least 4400 hours that requires no cooling or additional coating.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
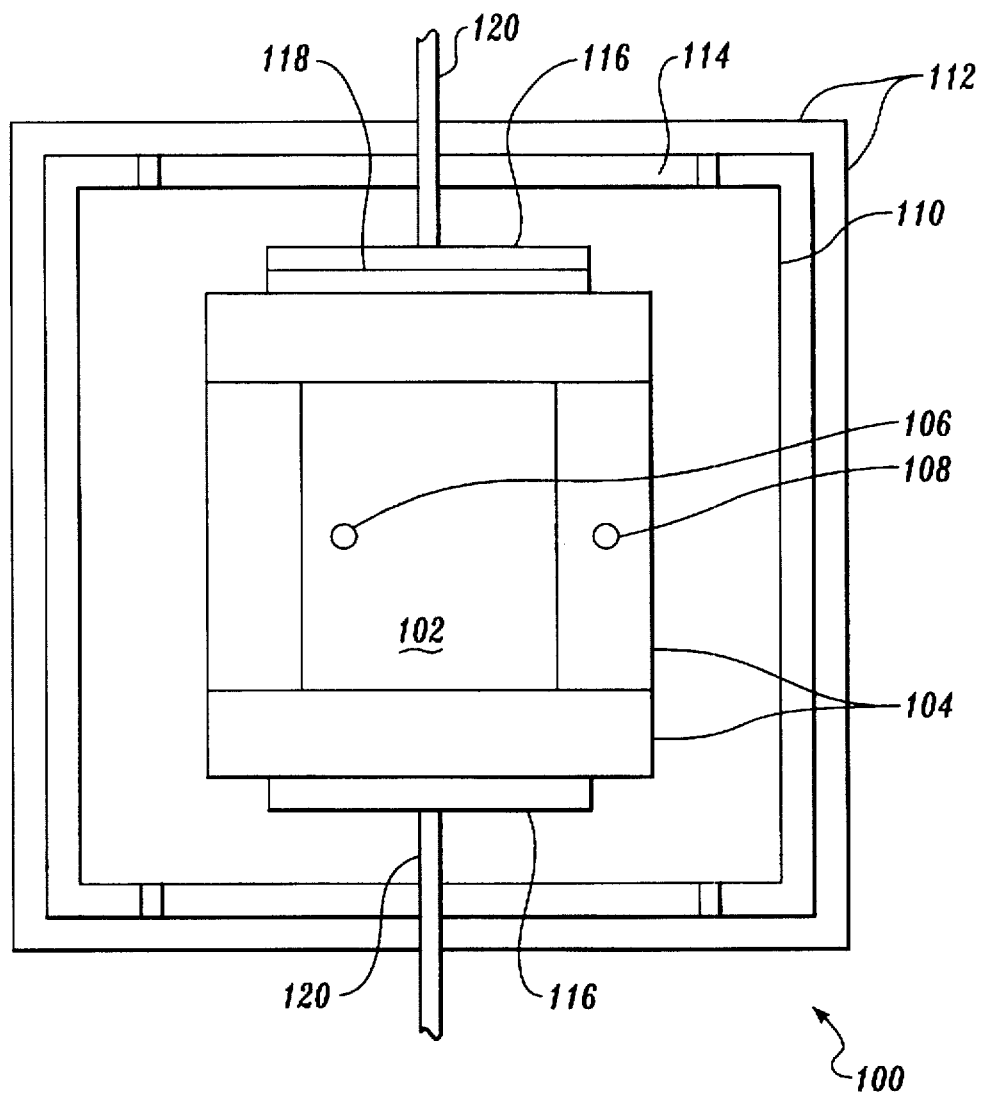
FIG. 1 is a plan view of a melter

The present invention is an electrode for conducting AC electricity for joule heating of earthen materials at elevated temperatures wherein the electrode is made of electrically conductive refractory material, specifically at least one electrically conductive metal oxide wherein the metal is selected from the group of chrome, rhodium, ruthenium, tin and combinations thereof. The balance of electrode material may include less electrically conductive metal oxides including but not limited to spinels containing chrome oxide, zirconium oxide, magnesium oxide, aluminum oxide, silicon oxide and combinations thereof. It is preferred that electrode have sufficient conductive metal oxide(s) to achieve an AC resistivity less than about 20 ohm-cm, more preferably less than about 10 ohm-cm, further preferably less than about 1 ohm-cm and most preferably less than about 0.1 ohm-cm. When chrome oxide is the only electrically conductive metal oxide, the preferred resistivity is achieved with an amount of chrome oxide greater than about 30 wt %, preferably greater than about 50 wt % and most preferably greater than about 75 wt %.

The operating temperature may exceed 1200 C. and preferably is from about 1350 C. to about 1500 C.

EXAMPLE 1

An experiment was conducted to demonstrate the lifetime of presently available electrodes when exposed to operating conditions of a jouled heated melter. An earthen material composition HTB-650 glass was prepared having the composition shown in Table E-1a.

For each test run, about 360 grams of HTB-650 glass powder was placed into a zirconia-grain-stabilized platinum-10% rhodium crucible. The filled crucible was placed into an electrically heated furnace at 1400 C. After the glass was molten, electrodes were placed into the melt until the electrodes were about ½ inch from the bottom of the crucible. Electricity as AC current of either 1 or 0.2 A/cm$^2$ was applied to the electrodes. The electrodes were kept in the melt for 24 hours or for seven (7) days. Corrosion rates were determined for three conditions, (i) electrochemical, (ii) 7-day static, and (iii) 24-hour static according to ASTM C621-84.

Electrodes for this experiment are shown in Table E-1b.

TABLE E-1a

| HTB-650 Glass Composition (wt %) | | | | | |
|---|---|---|---|---|---|
| Item | Amount | Item | Amount | Item | Amount |
| Ag$_2$O | 0.027 | La$_2$O$_3$ | 0.289 | SeO$_2$ | 0.005 |
| Al$_2$O$_3$ | 8.744 | Li$_2$O | 0.000 | SiO$_2$ | 41.744 |
| B$_2$O$_3$ | 0.051 | MgO | 0.091 | Sm$_2$O$_3$ | 0.018 |
| BaO | 0.046 | MnO$_2$ | 1.225 | SnO | 0.003 |
| Bi$_2$O$_3$ | 1.312 | MoO$_3$ | 0.146 | SrO | 0.279 |
| CaO | 1.390 | Na$_2$O | 17.089 | Ta$_2$O$_5$ | 0.001 |
| CdO | 0.794 | Nb$_2$O$_3$ | 0.027 | TeO$_2$ | 0.027 |
| CeO$_2$ | 1.909 | Nd$_2$O$_3$ | 5.831 | TiO$_2$ | 0.173 |
| Cl | 0.073 | NiO | 1.528 | Tl$_2$O$_3$ | 0.037 |
| Cr$_2$O$_3$ | 0.305 | P$_2$O$_5$ | 3.180 | Y$_2$O$_3$ | 0.018 |
| Cs$_2$O | 0.155 | PbO$_2$ | 0.217 | WO$_3$ | 0.118 |
| CuO | 0.064 | Pr$_2$O$_3$ | 0.036 | ZnO | 0.091 |
| F | 0.375 | Rb$_2$O$_3$ | 0.018 | ZrO$_2$ | 4.773 |
| Fe$_2$O$_3$ | 7.409 | SO$_3$ | 0.230 | | |
| K$_2$O | 0.150 | Sb$_2$O$_3$ | 0.002 | | |

TABLE E-1b

| Available Electrodes | | | |
|---|---|---|---|
| Material | Supplier | City, State | Composition |
| Chromium | | | metal |
| LT-1 | UCAR Carbon Company, Inc. | Clarksburg, WV | chromium-alumina |
| Platinum-10% Rhodium | | | metal |
| T1186 | CORHART Refractories | Louisville, KY | 98.5 wt % SnO$_2$ 1.5 wt % other |
| Tantalum | Schwarzkopf Technologies | Holliston, MD | metal |
| Tungsten | Schwarzkopf Technologies | Holliston, MD | metal |
| Molybdenum | Schwarzkopf Technologies | Holliston, MD | metal |

Corrosion test results are provided in Table E-1c. The chromium, LT-1 and tantalum completely corroded away during the test.

TABLE E-1c

| Corrosion Test Results, Averages (mm/year) | | | |
|---|---|---|---|
| Electrode | Electrochemical | 24-hour static | 7-day static |
| Chromium | 20 | 260 | >160 |
| LT-1 | 80 | >1068 | >150 |
| Platinum-10% Rhodium | 2.6 | — | 40 |
| T1186 | 28–190 | — | 87 |
| Tantalum | 34–130 | 220 | >133 |
| Tungsten | 75 | 250 | 43 |
| Molybdenum | 78–221 | 130 | 14 |

EXAMPLE 2

An experiment was conducted to demonstrate the lifetime of electrodes according to the present invention when exposed to operating conditions of a jouled heated melter. Experimental apparatus and methods were identical to those in Example 1

Sets of electrodes were made from commercially available refractory materials containing chrome oxide, specifically, C-1215Z obtained from CORHART Refractories Corporation, Louisville, Ky.; and Monofrax E, obtained from Carborundum, Falconer, N.Y.

The typical or average chemical compositions of these materials are provided in Table E-2a. Corrosion rates are shown in Table E-2b. It was unexpectedly discovered that chromia containing electrodes provided sufficient AC conductivity and had corrosion rates of half or less compared to non-chromia containing electrodes in the HTB-650 glass. The exception is platinum-10% rhodium that exhibited the lowest corrosion rate. However, because of the high cost of platinum, chromia is preferred.

TABLE E-2a

| Material Compositions (wt %) | | |
|---|---|---|
| | C-1215Z | Monofrax E |
| Cr$_2$O$_3$ | 91.2 | 77.7 |
| TiO$_2$ | 3.8 | |
| ZrO$_2$ | 3.0 | |
| Al$_2$O$_3$ | trace | 6.5 |
| MgO | trace | 7.4 |
| Fe$_2$O$_3$ | | 5.9 |
| SiO$_2$ | trace | 1.7 |
| Other | 2.0$^A$ | 0.8$^B$ |

$^A$SiO$_2$, CaO, B$_2$O$_3$, Al$_2$O$_3$, MgO, Alkali
$^B$Alakis (0.2), Other (0.6)

TABLE E-2b

Corrosion Test Results, Averages (mm/year)

| Electrode | Electrochemical | 24-hour static | 7-day static |
|---|---|---|---|
| C-1215Z | 9–37 | — | 2.0 |
| Monofrax E | 5.5 | — | 14.0 |

EXAMPLE 3

An experiment was conducted to

1) Measure the electrical conductivity of Monofrax E and compare experimental data to that supplied by the manufacturer;

2) Determine whether Monofrax E can conduct sufficient current load to provide all the heat for a Joule heated melter. Verify that the ceramic is not physically damaged by production scale current fluxes;

3) Determine the electrical resistance of Monofrax E at temperatures above those published by the manufacturer;

4) Investigate the ceramic performance at current fluxes and temperatures higher than would be expected in an operating system and find, if possible, upper operating limits.

The product literature for Monofrax E provides conductivity data, but it is limited to DC conductivity. In order to use Monofrax E as an AC electrode according to the present invention, it was desirable to determine the AC conductivity. Experimental assumptions were:

1) The melter is expected to require up to 550 amps during operation. Assume a maximum load up to 600 amps. For a 1 ft$^2$ block the current density is approximately 0.65 amps/cm$^2$.

2) Temperature at the face of the ceramic is 1300°–1550° C.

3) Assume thermal conductivity data from Carborundum is correct,
k=0.00233*T(F)-1.911 BTU/hr-ft-F.

Apparatus

Operational resistance of the ceramic was determined by conducting current through the block and measuring the voltage and current. A cylindrical block of ceramic was placed between graphite electrodes and place in a furnace with temperature control. To achieve block temperatures higher than the furnace limit the block and electrodes were insulated (inside the furnace) to retain resistance heat from the block. To limit heat lost by conduction through the graphite electrodes the electrodes were made a long as practical (2 ft.), turned to a small diameter except for the face contacting the ceramic block, and well insulated for the whole length.

Selecting the block size required considering that the blocks needed to be large enough to contain many of the heterogeneities of the ceramic. That is, the block should contain many areas of crystalline solid, glass solid, and voids. Scanning electron micrographs of the ceramic showed that the phases were distributed in dimensions of 10–100 microns. The largest heterogeneities were the voids on the order of ⅛–¼ inch at the largest. Convenient blocks sizes of 1–2 inches would contain sufficiently many heterogeneities to be representative of a full size 12"×12" block.

A small stream of nitrogen (0.5 CFM) was bled under the insulation to maintain an inert atmosphere around the hot graphite electrode to prevent destructive oxidation. The temperature of the block was monitored by a type C thermocouple placed as near as possible to the surface without contact. Contact was avoided so that the voltage of the block would not interfere with the baseline voltage of the thermocouple transmitter signal. At the temperature of the experiment, a type C thermocouple requires inerting. Gap between the block and thermocouple (TC) and inerting atmosphere were both achieved by placing the TC in an alumina tube ⅛" from the end. The tube was run through a small hole in the furnace and inner insulation against the ceramic test specimen. A very small flow (0.3–0.4 SCFH) of N$_2$ inerting gas was run through the tube. The effect of N2 flow on the TC measurement was determined by increasing the flow. The TC measurement went down (due to cooling from the N$_2$). After recalibrating at 0.3–0.4 SCFH, the flow was turned off for 30 seconds. There was not observed rise in TC reading. Evidently, cooling at this low flow is not significant.

A final feature of the apparatus was that the electrodes were vertically stacked between a platform scale on the bottom and a tension plate on the top. The top plate was spring loaded and adjustable to keep a force on the ceramic block pinched between the graphite electrodes. Changes in load could be monitored from the scale output. A load may be desirable to maintain intimate contact between the solid ceramic and graphite. In addition, a conductive paste (TiC) was placed between the surfaces before initial heat up to facilitate intimate contact.

If the ceramic tended to get soft at elevated temperatures the load would tend to deform the test piece. A maximum load was considered to be about 5 psi for the test. If pressures higher than this were necessary to assume good contact then it would be impractical on a full scale. A 1 ft$^2$ block at 5 psi would have a total for of nearly 700 lbf which could displace the ceramic blocks in the melter. They are held in place only by their weight using no grout.

Method

At the beginning of each test:

1) In-line electrodes and ceramic test piece were assembled; insulation was added; load was adjusted to 0–5 kg; inerting N2 flow (0.5 CFM into furnace, 0.3–0.4 SCFH to TC) was provided.

2) Furnace power was applied for heating to about 600 ° C. Between 600° C. and 800° C. heating rate was monitored so that block does not heat up faster then 10° C./min. (Carborundum suggested this precaution to avoid cracking due to thermal shock).

3) Above 800° C. ceramic was checked for sufficient conductivity by turning on power to electrodes. Power on current control was set at about two amps. If the block did not conduct 2 amps with a 110 V drop turn off the power to electrodes and continue increasing furnace temperature about 50 deg C. then try again.

When the test sample began to conduct the system was operated on current control. The furnace set points were adjusted to measure the voltage (and hence resistivity) at different temperatures to establish the resistance vs. temperature relation.

During the test, the computer data was verified by independent measurements of current and voltage using a Fluke multi-meter. Also temperature readings were verified by checking the MV signal directly on the TC leads and referring to a MV vs. temperature chart for the TC type.

Manipulation of the data assumed that all of the voltage drop occurred across the ceramic. Contributions to the overall resistance from the wiring, connections, and electrodes were assumed to be negligible. This method of determining resistance would overestimate the true resistance to the extent that these other contributors were significant.

The resistivity was calculated by:

Overall Resistance (R)=Voltage/current

Resistivity ($\rho$)=R*A/L

Where A=x-section area of block

L=length of block

Figure 2:
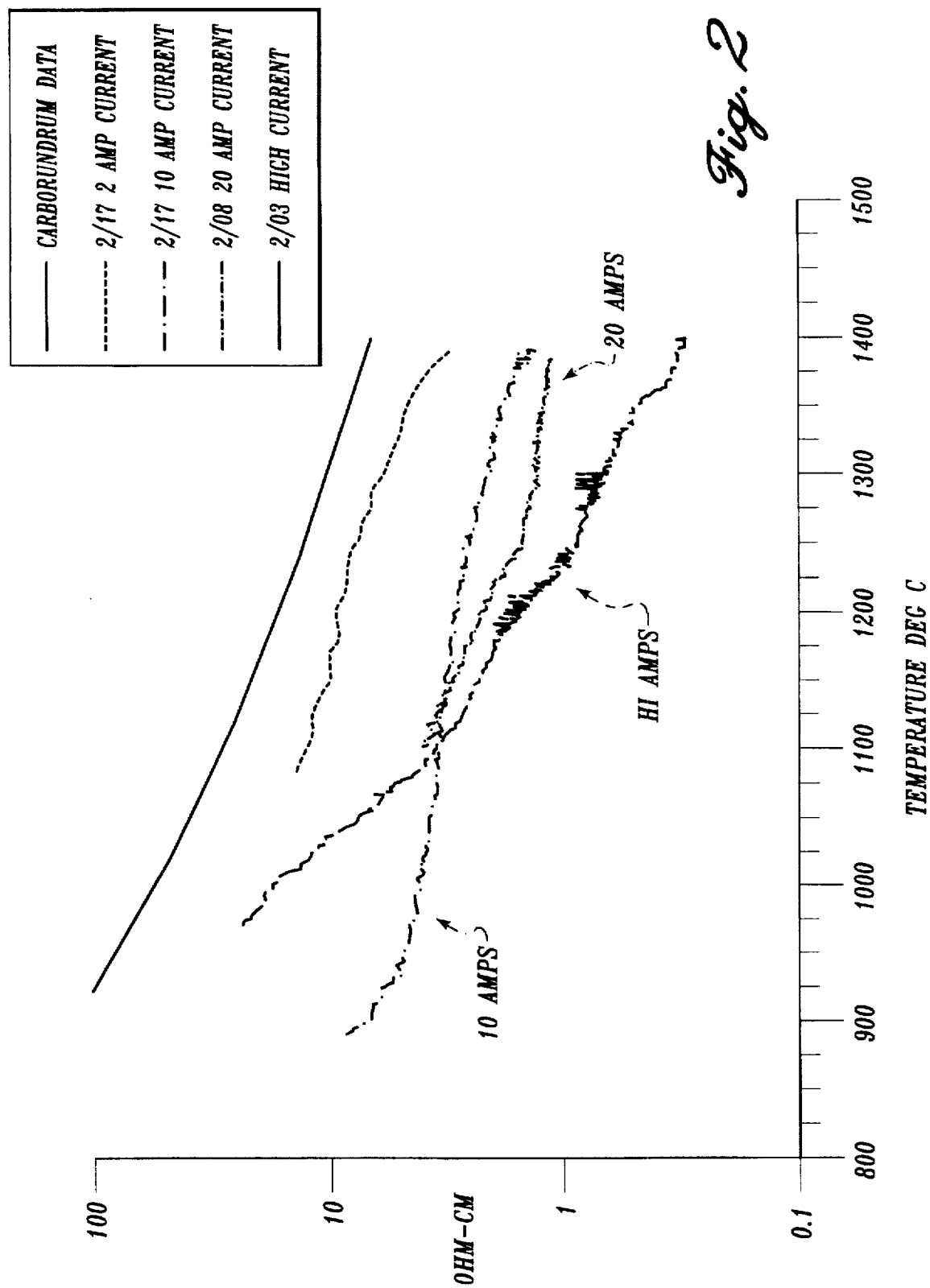
FIG. 2 is a graph of electrical resistivity versus temperature for Monofrax E.

Resistivities are shown in FIG. 2. Resistivities at all temperatures using AC electric current were lower than published data from Carborundum for the same temperatures which were believed to be based upon DC electric current. The Carborundum measurement method determines resistance directly, (i.e. extremely low current).

There appeared to be a reduction in resistivity with increasing current flux. This is a very curious result and begs for further investigation as to the mechanism. However, for the purposes of this experiment it is enough to know that the effective resistance of the block depends on the current flux. We may use the relationship of resistivity vs. temperature at the most extreme current flux expected in the actual melter, ie. 0.65 amp/cm$^2$. This test used 4.3 cm diameter cylinders of ceramic. A total current of approximately 10 amps would match the current density expect for the ATM.

A least squares fit of the data at 10 amps for an Arrhenius form relationship indicates:

$\rho$(ohm-cm)=0.0508*exp (5785/T(K)) (the correlation coefficient (r) for this fit is 0.945.)

The results of the resistivity vs. temperature were used to calculate the temperature profile within the E block while it was being used as a conductor to power the ATM.

Using the Carborundum resistivity data the expected peak temperature was over 500° C. below melting temperatures of the ceramic. Estimates using experimental data indicate an even larger, 600° C. margin of safety.

Before the tests were run at production level current fluxes, a test run was conducted at very high current fluxes to generate as much heat as possible. When running at over 10X the expected melter current density (i.e. 6.8 amps/cm$^2$ [e.g., 100 amps in test]) the block was destroyed and the test was aborted. The center of the block was melted away beginning at the upper face. A second test at 2X expected current density was conducted without difficulty. Inspection of the block after testing, however, showed some deformation of the block around an area of especially high void space. Some solid blisters, also, appeared on the cylinder sides. Carborundum indicated that such blisters were common when E-block is heated and are not necessarily a result of using the block as a conductor. Their explanation is that the blisters are associated with an area of unusually high glass phase volume and are caused by some flow of the low melting glass phase. Carborundum stated that their experience does not indicate blisters are related to imminent failure.

After the trial, the specimen and an unheated specimen were sliced and examined under an optical microscope and under a scanning electron microscope (SEM). If the block melted in local areas and froze again upon cooling there should be change in crystal grain around those areas. No evidence of local melting or crystal changes could be identified. The SEM also examined areas with x-ray diffraction to determine whether any significant compositional changes occurred. There were no new phases in the heated sample. All the crystalline compositions in the heated sample were also evident in the unheated sample. The only observable difference was that in the unheated sample there appeared to be areas of mixture between the Chrome oxide and Chrome spinel phases. In the heated samples these separations were more distinct. More developed crystallization is entirely consistent with the extra time at higher temperatures and has no significant effect on the conductivity.

A block specimen operated for several hours at current similar (slightly greater) to those expected in actual operation showed no damage or deformation.

Conclusions

Effective resistance of E-block when conducting current at 0.65 amp/cm$^2$ will be significantly lower than predicted by Carborundum published data.

Effective resistance of E-block is inversely related to the current flux at any temperature where E-block is a conductor. The higher the current the lower the effective resistance.

The operating temperatures within a 6" thick E-block while conducting current at 0.6 amps/cm$^2$ are expected to be well below melting temperatures of the ceramic.

E-block may be used as a conductor without physical damage at current fluxes up to 0.68 amps/cm$^2$. At significantly higher current flux there is increasing damage from melting. Areas first damaged appear to be around portions of high void fraction.

ELECTRODE EMBODIMENTS

In FIG. 1 there is shown a plan view of a melter 100. The melter has a melt chamber 102 defined by chamber walls 104. A drain 106 permits removal of molten material from the bottom of the melt chamber 102 and an overflow 108 is provided to handle excess molten material. Insulating walls 110 surround the chamber walls 104, and outer walls 112 permit a cooling water jacket 114 between the insulating walls 110 and the outer walls 112.

According to the present invention, at least one opposing pair of the chamber walls 104 are made of an electrically conductive refractory metal oxide material wherein the metal is chrome, ruthenium, rhodium or combinations thereof. In addition, a buss plate 116 is attached directly to a chamber wall 104 or a contact material 118 is interposed between the chamber wall 104 and the buss plate 116. The buss plate 116 is connected to a buss rod 120 for connection to an electrical power supply (not shown). The buss plate 116 and rod 120 are preferably of the same material, and may be made from materials including but not limited to Inconel, molybdenum or graphite. The contact material 118 is preferably used to insure good electrical contact between the buss plate 116 and the chamber wall 104. The contact material 118 is preferably nickel metal or titanium oxide paste. In this embodiment, the chamber walls 104 serve both as containment for the molten material and as electrodes for joule heating the molten material. It is preferred that the buss contact face of the chamber wall 104 be trued to a flatness and smoothness comparable to the sides of the chamber wall 104 that are in contact with other wall elements. It is to be noted that the buss plate 116 is attached on the dry side of the chamber wall 104 so that the buss plate 116 is not in contact with molten material.

Elimination of rod type insertable electrodes has advantages of lower cost of melter fabrication and improved operational performance. By using the materials of the present invention, the chamber wall electrodes will exhibit a lifetime equivalent to the lifetime of other major melter components, for example the insulating walls 110. It may, however, be advantageous in certain applications to make a rod type electrode according to the present invention. For example, it may be desirable to use a conductive refractory oxide for an In-Situ Vitrification process.

EXAMPLE 4

A small-scale high temperature melter was constructed in accordance with FIG. 1 using Monofrax E in opposing chamber walls. The other pair of chamber walls was Monfrax K3. The melter was operated for 21 processing days over an 8 month period. Operating temperatures were between 1350 C. and 1450 C.. Three waste simulants were tested in three separate operating campaigns. The first simulant was primarily sodium oxide and silica. The second and third simulants were Hanford high-level waste compositions N-508 and HTB650. These simulants had operating viscosity targets of 40 poise which required operating temperatures of 1350 C. 1350 C. and 1375 C. respectively.

The glass contact surface area of each Monofrax-E electrode varied between 1150 and 1600 $cm^2$ because of level fluctuations from pouring through the bottom drain. Electric current ranged from 300 to 760 amperes, or from about 0.19 to about 0.66 amperes/$cm^2$ current density. Estimated corrosion rates for the Monofrax-E based upon post operation measurements range from about 25 mm/year to about 50 mm/year and for the Monofrax-K 3 9 mm/year to about 18 mm/year.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An electrode for melting glass or ceramic materials, said electrode, comprising:
    (a) at least one electrically conductive metal oxide wherein the metal of the metal oxide is selected from the group of chrome, rhodium, ruthenium, and combinations thereof, said at least one electrically conductive metal oxide present in an amount of at most about 91.2 wt %; and
    (b) a balance of substantially at least one other metal oxide, the electrode having an AC resistivity of less than or about 10 ohm-cm at about 1200° C. said AC electrical resistivity decreasing with increasing temperature.

2. The electrode as recited in claim 1, wherein the at least one other metal oxide is selected from the group of aluminum oxide, magnesium oxide, iron oxide, tin oxide, silicon oxide, sodium oxide, titanium oxide, zirconium oxide, calcium oxide, boron oxide, and combinations thereof.

3. The electrode as recited in claim 1, wherein said electrode is one side of a melt chamber wall.

4. The electrode as recited in claim 3, further comprising a buss plate attached to the melt chamber wall, said buss plate contacting a dry side of said melt chamber wall.

5. The electrode as recited in claim 4, wherein the buss plate is made from a material selected from the group of Inconel, molybdenum and graphite.

6. The electrode as recited in claim 4, further comprising a contact material interposed between the buss plate and the melt chamber wall.

7. The electrode as recited in claim 6, wherein said contact material is selected from the group of nickel metal and titanium oxide paste.

8. A joule heated melter having a melt chamber defined by chamber walls, said chamber walls surrounded by insulating walls, the melt chamber confining a molten pool, the molten pool heated by electrical joule heating, the electricity provided through at least two electrodes contacting the molten pool, characterized in that:
    said electrodes are chamber walls comprising
    (a) least one electrically conductive metal oxide wherein the metal is selected from the group of chrome, rhodium, ruthenium, and combinations thereof, said at least one electrically conductive metal oxide present in an amount of at least about 27 wt %;
    (b) a balance of at least one other metal oxide; and
    (c) a buss plate attached to said chamber walls.

9. The melter as recited in claim 8, wherein the at least one other metal oxide is selected from the group of aluminum oxide, magnesium oxide, iron oxide, tin oxide, silicon oxide, sodium oxide, titanium oxide, zirconium oxide, calcium oxide, boron oxide, and combinations thereof.

10. The melter as recited in claim 8, wherein the buss plate is made from a material selected from the group of Inconel, molybdenum and graphite.

11. The electrode as recited in claim 8, further comprising a contact material interposed between the buss plate and the melt chamber wall.

12. The electrode as recited in claim 11, wherein said contact material is selected from the group of nickel metal and titanium oxide paste.

13. A method of melting an earthen material, comprising the steps of:
    (a) defining a melt chamber with a plurality of containment walls wherein at least one opposing pair of containment walls is made from an electrically conductive metal oxide, the metal of the metal oxide selected from the group of chromium, ruthenium, and rhodium, the metal oxide present in an amount of at least 30 wt % with a balance substantially of at least a second metal oxide;
    (b) placing a buss plate on each of said pair of containment walls so that the buss plate is external to the melt chamber;
    (c) filling the melt chamber with the earthen material; and
    (d) flowing electricity through the pair of containment walls thereby raising a temperature of the earthen material and melting it.

14. The method as recited in claim 13, wherein said electricity is in an amount of at least about 0.65 amp/$cm^2$.

15. The method as recited in claim 13, wherein said earthen material is a glass composition.

16. The method as recited claim 15, wherein the glass composition is a silica glass.

17. The method as recited in claim 16, wherein the silica glass is HTB-650.

18. A method of melting an earthen material, comprising the steps of:
    (a) defining a melt chamber with a plurality of containment walls;
    (b) providing at least one opposing pair of electrodes made from an electrically conductive metal oxide, the metal of the metal oxide selected from the group of chromium, ruthenium, and rhodium, the metal oxide present in an amount of at not more than 91.2 wt % with a balance substantially of at least a second metal oxide;

(c) placing a buss plate on each of said pair of electrodes so that the buss plate is external to the melt chamber;

(d) filling the melt chamber with the earthen material in contact with the electrodes; and (e) flowing AC electricity through the pair of electrodes thereby raising the temperature of the earthen material and melting it.

19. The method as recited in claim 18, wherein at least one of said electrodes is part of one of said plurality containment walls.

20. The method as recited in claim 18, wherein said AC electricity has a current density of at least 0.2 A/cm$^2$.

21. The electrode as recited in claim 1, wherein said concentration is no more than about 77.7 wt %.

22. The electrode as recited in claim 1, wherein said concentration is from about 27 wt % to about 91.2 wt %.

* * * * *